United States Patent
Chun et al.

(10) Patent No.: US 12,169,410 B2
(45) Date of Patent: *Dec. 17, 2024

(54) ROBOT FOR PREVENTING INTERRUPTION WHILE INTERACTING WITH USER

(71) Applicant: SAMSUNG ELECTRONICS CO., LTD., Suwon-si (KR)

(72) Inventors: Jaemin Chun, Suwon-si (KR); Youngsun Kim, Seoul (KR); Minseok Han, Suwon-si (KR); Segwon Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/481,820

(22) Filed: Oct. 5, 2023

(65) Prior Publication Data

US 2024/0028043 A1 Jan. 25, 2024

Related U.S. Application Data

(63) Continuation of application No. 17/123,412, filed on Dec. 16, 2020, now Pat. No. 11,797,021.

(30) Foreign Application Priority Data

Dec. 18, 2019 (KR) .......................... 10-2019-0169741

(51) Int. Cl.
*G05D 1/2285* (2024.01)
*B25J 9/16* (2006.01)
(Continued)

(52) U.S. Cl.
CPC .......... *G05D 1/0246* (2013.01); *B25J 9/1697* (2013.01); *B25J 11/0005* (2013.01);
(Continued)

(58) Field of Classification Search
CPC ... G05D 1/0246; G05D 1/0094; B25J 9/1697; B25J 11/0005; B25J 13/003;
(Continued)

(56) References Cited

U.S. PATENT DOCUMENTS

| 11,480,968 | B1* | 10/2022 | Atrash | ................. G05D 1/0214 |
| 2007/0192910 | A1* | 8/2007 | Vu | ....................... G05D 1/0246 |
| | | | | 901/1 |

(Continued)

FOREIGN PATENT DOCUMENTS

| JP | 2000-20092 A | 1/2000 |
| JP | 2007-257088 A | 10/2007 |

(Continued)

*Primary Examiner* — Sohana Tanju Khayer
(74) *Attorney, Agent, or Firm* — Sughrue Mion, PLLC

(57) ABSTRACT

A robot includes a driver; a camera; and a processor configured to: during an interaction session in which a first user identified in an image obtained through the camera is set as an interaction subject, perform an operation corresponding to a user command received from the first user, and determine whether interruption by a second user identified in an image obtained through the camera occurs, and based on determining that the interruption by the second user occurred, control the driver such that the robot performs a feedback motion for the interruption.

17 Claims, 16 Drawing Sheets

(51) Int. Cl.
    *B25J 11/00*     (2006.01)
    *B25J 13/00*     (2006.01)
    *B25J 13/08*     (2006.01)
    *G05D 1/00*     (2006.01)
    *G05D 1/223*     (2024.01)
    *G05D 1/24*     (2024.01)
    *G05D 1/242*     (2024.01)
    *G06F 3/0488*     (2022.01)
    *G06V 20/10*     (2022.01)
    *G06V 40/10*     (2022.01)
    *G10L 25/78*     (2013.01)
    *G05D 111/00*     (2024.01)

(52) U.S. Cl.
    CPC ........... *B25J 13/003* (2013.01); *B25J 13/081* (2013.01); *G05D 1/0094* (2013.01); *G05D 1/2232* (2024.01); *G05D 1/24* (2024.01); *G05D 1/2424* (2024.01); *G06F 3/0488* (2013.01); *G06V 20/10* (2022.01); *G06V 40/10* (2022.01); *G10L 25/78* (2013.01); *B25J 9/161* (2013.01); *G05D 2111/00* (2024.01)

(58) Field of Classification Search
    CPC ....... B25J 13/081; B25J 9/161; G06F 3/0488; G06F 1/3265; G06F 1/3287; G06F 3/013; G06F 3/0304; G06F 3/167; G06F 1/3231; G06V 20/10; G06V 40/10; G06V 40/16; G06V 10/96; G10L 25/78; Y02D 10/00
    See application file for complete search history.

(56) References Cited

U.S. PATENT DOCUMENTS

| | | | |
|---|---|---|---|
| 2018/0311816 | A1 | 11/2018 | Sakamoto et al. |
| 2018/0333862 | A1* | 11/2018 | Hayashi ............... A63H 13/005 |
| 2018/0361583 | A1* | 12/2018 | Williams ............... G06V 20/10 |
| 2019/0143528 | A1* | 5/2019 | Hayashi ............... B25J 11/0015 |
| | | | 700/245 |
| 2019/0173446 | A1* | 6/2019 | Knode .................... H03G 3/32 |
| 2021/0314659 | A1* | 10/2021 | Gao .................... H04N 21/4223 |
| 2021/0362343 | A1* | 11/2021 | Kim .................... B25J 13/081 |

FOREIGN PATENT DOCUMENTS

| | | |
|---|---|---|
| JP | 2012-76162 A | 4/2012 |
| KR | 10-0678728 B1 | 2/2007 |
| KR | 10-1772583 B1 | 8/2017 |
| KR | 10-1865691 B1 | 6/2018 |
| WO | 2006/135209 A1 | 12/2006 |

\* cited by examiner

ROBOT FOR PREVENTING INTERRUPTION WHILE INTERACTING WITH USER

CROSS-REFERENCE TO RELATED APPLICATION(S)

This application is a continuation of U.S. application Ser. No. 17/123,412, filed Dec. 16, 2020 (allowed), which is based on and claims priority under 35 U.S.C. § 119 to Korean Patent Application No. 10-2019-0169741, filed on Dec. 18, 2019 in the Korean Intellectual Property Office, the disclosure of which is incorporated by reference herein in its entirety.

BACKGROUND

1. Field

The disclosure relates to a robot that performs at least one operation based on a user command, and more particularly, to a robot that prevents interruption by another user during interaction with a specific user.

2. Description of Related Art

A related art robot that provides an interaction-based service for a plurality of unspecified users is vulnerable to interruption by another user (ex. attention hijacking) during interaction with a specific user.

In particular, in the case of a robot that may be used in a public place and/or used by a plurality of users, there is a problem that interaction with another user may inevitably begin even before an interaction session with a specific user is clearly finished.

SUMMARY

Embodiments provide an electronic apparatus that prevents interruption by another user during an interaction session with a user.

Embodiments provide an electronic apparatus which, in case interruption by another user occurs during an interaction session with a user, maintains the interaction session that is currently proceeding, and provides a feedback motion that can prevent interruption.

A robot according to an embodiment includes a driver, a camera, and a processor which, during an interaction session wherein a first user identified in an image acquired through the camera is set as an interaction subject, performs an operation corresponding to a user command received from the first user. The processor is configured to, during the interaction session, determine whether interruption by a second user identified in an image acquired through the camera occurs, and based on determining that interruption by the second user having occurred, control the driver such that the robot performs a feedback motion for the interruption.

An operating method of a robot according to an embodiment includes the steps of, during an interaction session wherein a first user identified in an image acquired through a camera is set as an interaction subject, performing an operation corresponding to a user command received from the first user, and during the interaction session, determining whether interruption by a second user identified in an image acquired through the camera occurs, and based on determining that interruption by the second user having occurred, performing a feedback motion for the interruption.
user command

DETAILED DESCRIPTION

Figure 1A:
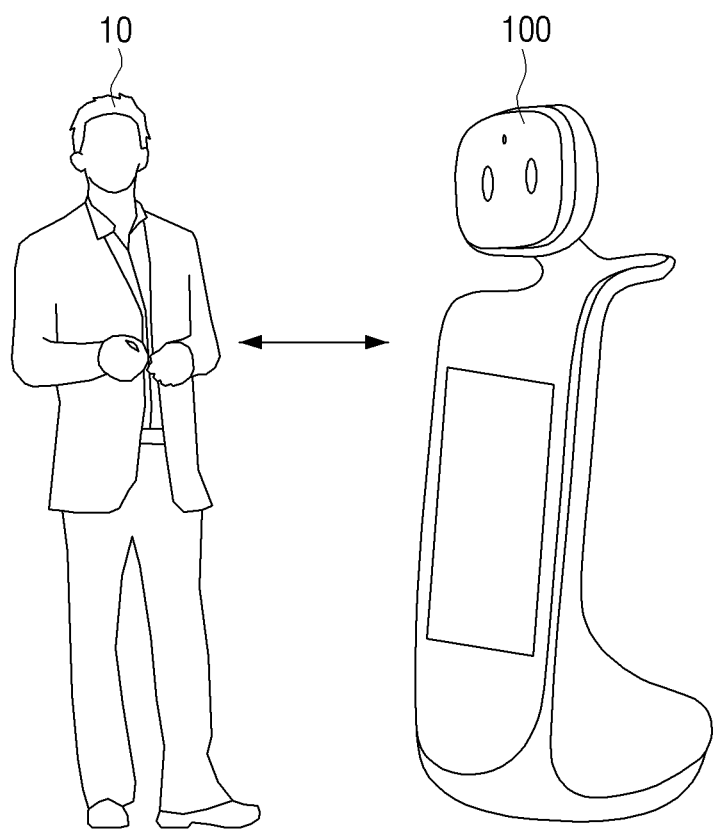
FIG. 1A is a diagram for schematically illustrating an operation of a robot according to an embodiment.

Before describing the disclosure in detail, the description format of this specification and the drawings will be explained.

First, as terms used in this specification and the claims, general terms were selected, in consideration of the functions of embodiments. However, the terms may vary depending on the intention of those skilled in the art, legal or technical interpretation and emergence of new technologies, etc. Also, there are some terms that were arbitrarily designated by the applicant, and the meaning of such terms may be interpreted as defined in this specification. Meanwhile, terms that are not specifically defined in the disclosure may be interpreted based on the overall content of this specification and common technical knowledge in the pertinent art.

Also, the same reference numerals or symbols described in each drawing accompanying this specification refer to components or elements performing substantially the same functions. For the convenience of explanation and understanding, the components or elements will be described by using the same reference numerals or symbols in different embodiments. That is, even if all elements having the same reference numerals are illustrated in a plurality of drawings, the plurality of drawings do not mean one embodiment.

In addition, in this specification and the claims, terms including ordinal numbers such as "the first," "the second," etc. may be used for distinguishing elements. These ordinal numbers are used to distinguish the same or similar elements from one another, and the meaning of the terms are not to be interpreted in a restrictive way due to use of such ordinal numbers. For example, the orders of usage or the orders of arrangement, etc. of elements combined with such ordinal numbers are not to be restricted by the numbers. Also, depending on needs, each ordinal number may be interchangeably used.

Further, in this specification, singular expressions include plural expressions as long as they do not mean differently in the context. In addition, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Also, in the embodiments of the disclosure, terms such as "a module," "a unit," and "a part" are for referring to elements performing at least one function or operation, and these elements may be implemented as hardware or software, or as a combination of hardware and software. Further, a plurality of "modules," "units," and "parts" may be integrated into at least one module or chip and implemented as at least one processor, except when each of them needs to be implemented as independent specific hardware.

In addition, in the embodiments of the disclosure, the description that a portion is connected to another portion includes both the case where a portion is directly connected to another portion, and the case where a portion is indirectly connected to another portion through still another medium. Also, the description that a portion includes an element means that other elements may additionally be included, but not that other elements are excluded, unless there is any specific description meaning the contrary.

Figure 1B:
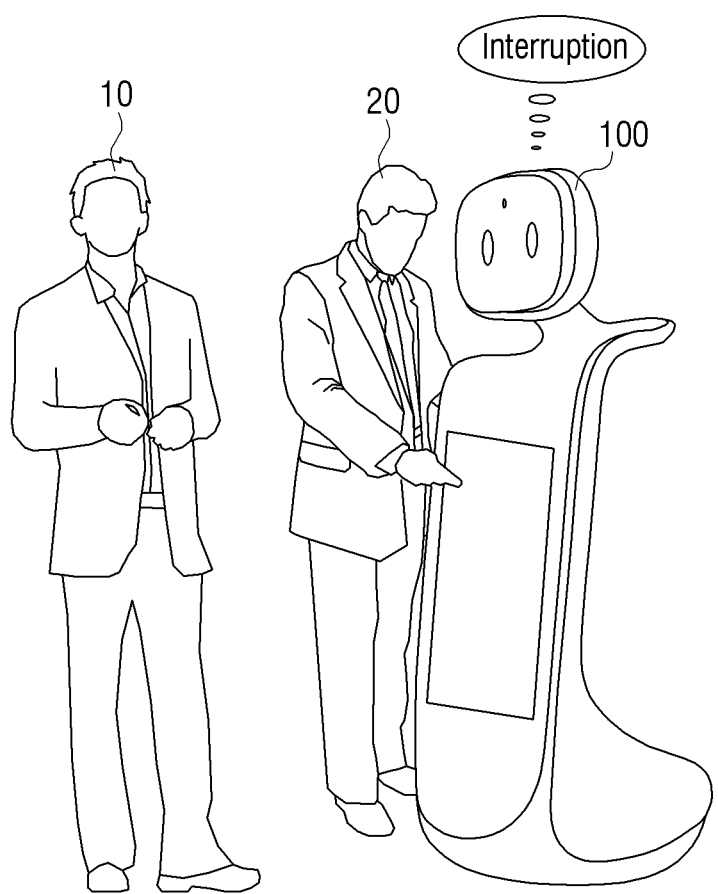
FIG. 1B is a diagram for schematically illustrating an operation of a robot according to an embodiment.
Figure 1C:
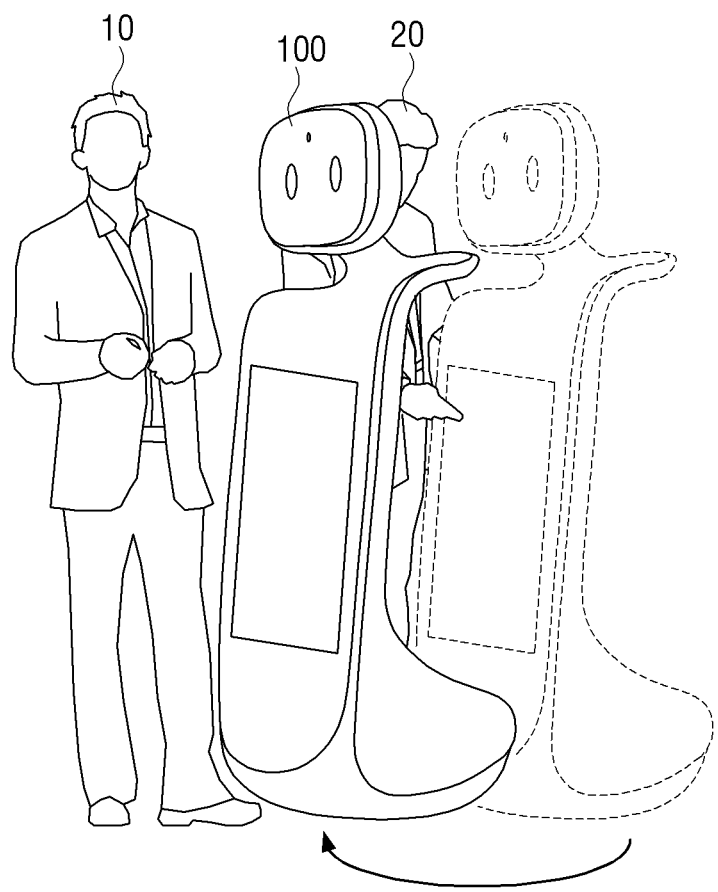
FIG. 1C is a diagram for schematically illustrating an operation of a robot according to an embodiment.

FIG. 1A to 1C are diagrams for schematically illustrating an operation of a robot according to an embodiment.

Referring to FIG. 1A, the robot 100 may set a user 10 identified through a camera and/or a sensor, etc. as an interaction subject, and during an interaction session wherein the user 10 is set as the interaction subject, the robot 100 may provide one or more services to the user 10. Specifically, the robot 100 may perform one or more operations based on an instruction of the user 10 received in various forms such as a touch, a voice, a motion, etc.

Meanwhile, referring to FIG. 1B, during an interaction session with the user 10, a user command may be input into the robot 100 from another user 20. In this case, the robot 100 may determine that interruption by another user 20 for the interaction with the user 10 occurred.

Here, referring to FIG. 1C, the robot 100 may perform a feedback motion for avoiding or preventing interruption by the user 20. A feedback motion means a motion of the robot 100 for expressing refusal or disregarding of interruption by another user during an interaction session.

Specifically, referring to FIG. 1C, the robot 100 may move to avoid the user 20, and may get closer to the user 10. Here, the location of the robot 100 may be changed such that the side surface or the rear surface of the robot 100 is toward the user 20 and the front surface of the robot 100 is toward the user 10.

As described above, the robot 100 according to an embodiment provides a feedback motion for interruption by another user who is not an interaction subject, and thereby maintain a state wherein interaction with a user who is an interaction subject is easy, and at the same time, express nonverbally an intent of disregarding interruption by another user.

Hereinafter, a configuration and operations of a robot according to an embodiment will be described in more detail with reference to the accompanying drawings.

Figure 2A:
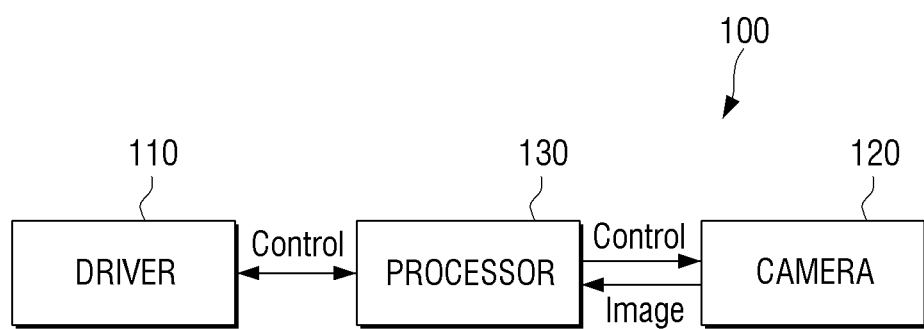
FIG. 2A is a block diagram for illustrating a configuration of a robot according to an embodiment of the disclosure.

FIG. 2A is a block diagram for illustrating a configuration of a robot according to an embodiment. Referring to FIG. 2A, the robot 100 may include a driver 110, a camera 120, a processor 130, etc.

The driver 110 is a component for controlling the motions or movements of the robot 100. For this, the driver 110 may control the moving means of the robot 100. Other than this, the driver 110 may be electronically connected with a mechanical component implementing physical movements of the robot 100 and drive/control the component.

Taking the robot 100 in FIG. 1A as an example, the driver 110 may control mechanical components, etc. that control rotation of the wheel under the body of the robot 100 in FIG. 1A, and the head attached on the body of the robot 100 in FIG. 1A. Other than this, in case separate components such as arms or legs are included in the robot, the driver 110 may be implemented to drive the movements of the arms and legs.

The camera 120 is a component for acquiring(obtaining) an image around the robot 100, and it may include an RGB camera, a depth camera, an RGB-Depth (D) camera, etc. Also, the camera 120 may be implemented as a stereo camera or a 3D camera.

The robot 100 may acquire not only an RGB image but also a depth image for the surroundings of the robot 100 through the camera 120. In the robot 100, a plurality of cameras may be included.

The processor 130 is a component for controlling the components included in the robot 100. The processor 130 may be implemented as a generic-purpose processor such as a central processing unit (CPU), an application processor (AP), etc., a graphic-dedicated processor such as a graphic processing unit (GPU), a vision processing unit (VPU), etc., or an artificial intelligence-dedicated processor such as a neural processing unit (NPU), etc. Also, the processor 130 may include a volatile memory such as an SRAM, etc.

The processor 130 may set a user identified in an image acquired through the camera 120 as a subject (: a counterpart) of interaction.

Interaction may mean communication between the robot 100 and a user. For performing interaction with a user, the robot 100 may include a user inputter for receiving user commands, a display and a speaker for outputting various information, etc., but the disclosure is not limited thereto.

As an example, if a user is identified in an image acquired through the camera 120, the processor 130 may set the user as a subject of interaction. Here, the processor 130 may identify the user by inputting the image into an artificial intelligence model trained to identify objects.

Also, as an example, if at least one user command is received from a user, the user may be identified through an image acquired through the camera 120. Here, the processor 130 may set the user as a subject of interaction. A user command may be received at the robot 100 in various forms such as a touch manipulation, a voice, a motion, etc.

Here, the processor 130 may detect and identify a user who input a user command through a sensor (a LiDAR sensor, an ultrasonic sensor, etc.) and the camera 120. Specifically, in case a user command is received, the processor 130 may detect an adjacent object through a sensor, and identify the object (: the user) through an image photographed in the direction of the detected object.

For example, in case a touch manipulation is input into the touch screen display of the robot 100, if a motion that a user's hand touches the touch screen display is detected through an image acquired through the camera 120, the user may be set as a subject of interaction. Also, for example, in case a voice is received at the microphone of the robot 100, a user may be identified by using an image photographed within a predetermined range of a field of view based on the direction that the microphone that received the voice faces, and the user may be set as a subject of interaction.

Meanwhile, after a user is identified through an image acquired through the camera 120, in case at least one user command is received from the identified user, the user may be set as a subject of interaction.

As described above, if a user is set as a subject of interaction, an interaction session with the user may start.

An interaction session means a period for the robot 100 to receive at least one user command from a user set as a subject of interaction, and perform at least one operation based on the received user command. Also, an interaction session may mean a period for the robot 100 to transmit and receive a conversation or information with a user.

Accordingly, during an interaction session, the processor 130 may perform an operation corresponding to a user command received from a user set as a subject of interaction. As a result, one or more services may be provided to the user who is the subject of interaction. A service may vary according to the function of the robot 100. For example, if the robot 100 is a receptionist robot, a service that displays information regarding a requested location or makes the robot 100 directly move to the location according to a user command may be provided. As types of services may be various depending on the use of the robot 100, they are not limited to the aforementioned examples.

During an interaction session, the processor 130 may control the driver 110 such that the front surface of the robot 100 is toward the user. On the front surface of the robot 100, a touch screen display for receiving input of a touch manipulation corresponding to a user command may be provided.

Also, the processor 130 may control the driver 110 such that the location of the robot 100 is located within a predetermined distance from the user during an interaction session.

The processor 130 according to an embodiment may determine whether interruption by another user identified in an image acquired through the camera 120 occurs during an interaction session.

Interruption may mean all factors that interrupt or inhibit interaction and service provision during an interaction session that is currently proceeding. Specifically, a user command or interception by another user during an interaction session with a user may be examples of interruption, but the disclosure is not limited thereto.

Another user may mean a user who is not a user set as a subject of interaction. The processor 130 may distinguish a user who is a subject of interaction and a user who is not a subject of interaction by using the camera 120. Here, the processor 130 may output feature information from an image including the face of the user who is the subject of interaction, and recognize in real time the face of the user who is the subject of interaction based on the feature information. Here, an artificial intelligence model trained to perform face recognition by comparing feature information may be used. As a result, a user who is a subject of interaction and a user who is not a subject of interaction may be distinguished in an image acquired through the camera 120.

Also, the processor 130 may track the location of a user who is a subject of interaction through a sensor (a LiDAR sensor, an ultrasonic sensor, etc.), and also detect another user who is not the user who is the subject of interaction through the sensor.

In case at least one user command is received from another user during an interaction session, the processor 130 may determine that interruption occurred by another user. In this regard, detailed examples will be described later through FIG. 3 to FIG. 5.

During an interaction session, in case it is determined that another user is located between a user set as a subject of interaction and the robot 100, the processor 130 may determine that interruption occurred. In this regard, a detailed example will be described later through FIG. 6.

Other than this, various events inhibiting the efficiency of interaction with a user who is a subject of interaction may be defined to be included in interruption, and according to the defined interruption, the configuration of the robot 100 or the operation of the processor 130 can be modified within a range of common technical knowledge.

If it is determined that interruption by another user occurred, the processor 130 may control the driver 110 such that the robot 100 performs a feedback motion for the interruption.

A feedback motion means a motion of the robot 100 for expressing refusal or disregarding for interruption by another user during an interaction session. Also, a feedback motion may mean a motion that expresses attention for a user set as a subject of current interaction.

For example, in case interruption by another user occurred during an interaction session, the processor 130 may control the driver 110 to perform a feedback motion wherein the front surface of the robot 100 is toward the user set as the subject of interaction, and is against another user who generated the interruption.

Specifically, the processor 130 may control the driver 110 to perform a feedback motion wherein the robot 100 moves to a location wherein the front surface of the robot is toward a user set as a subject of interaction and the side surface or the rear surface of the robot is toward a user who generated interruption.

Also, the processor 130 may control the driver 110 such that the robot 100 approaches closer to the user set as the subject of interaction than before the generation of interruption. Here, the processor 130 may control the driver 110 such that the robot 100 is driven to avoid the user who generated interruption.

Other than this, the processor 130 may control the driver 110 to perform various feedback motions for expressing refusal for interruption.

As a result, an optimal circumstance wherein the robot 100 receives a user command of a user set as a subject of interaction and can provide a service to the user despite interruption by another user can be maintained.

Figure 2B:
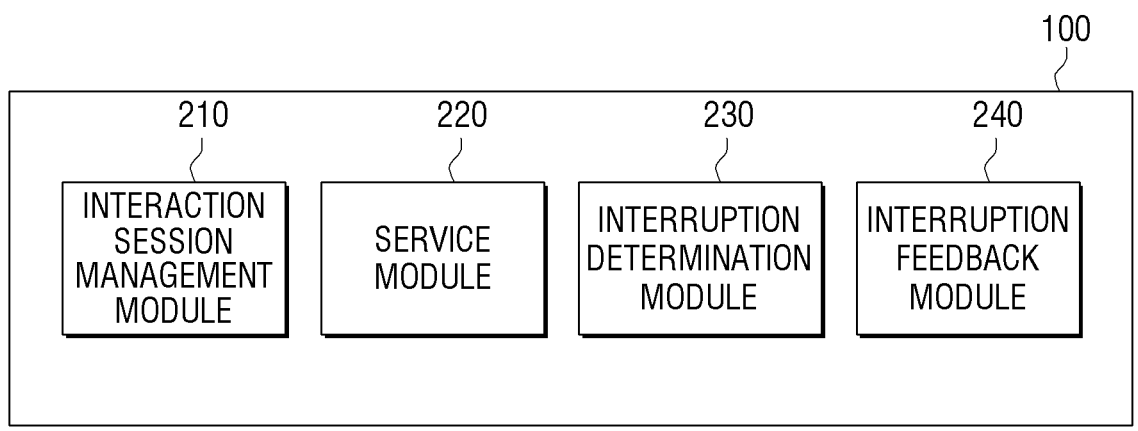
FIG. 2B is a block diagram for illustrating a functional configuration of a robot according to an embodiment.

FIG. 2B is a block diagram for illustrating a functional configuration of a robot according to an embodiment. Each module illustrated in FIG. 2B may be stored in the form of software in the memory of the robot 100 and may be selectively executed by the processor 130. Also, each module illustrated in FIG. 2B may be implemented in the form of a circuit on the robot 100 and controlled by the processor 130. Further, each module may be implemented as a form wherein software and hardware are combined.

Referring to FIG. 2B, the robot 100 may include an interaction session management module 210, a service module 220, an interruption determination module 230, an interruption feedback module 240, etc.

The interaction session management module 210 is a component for setting start/maintenance/ending of an interaction session for a user, in case at least one user is set as a subject of interaction.

As an example, in case a user is identified in an image acquired through the camera 120, the interaction session management module 210 may start an interaction session with the user.

Afterwards, if a predetermined event for ending of an interaction session occurs, the interaction session management module 210 may end the interaction session.

The predetermined event for ending may include a case wherein provision of a service requested by the user ends, a case wherein a user command is not received during a specific time period from the user, etc.

Also, an event related to ending may include a case wherein it is identified that the user does not look at the robot 100 for more than a specific time period. In this case, the processor 130 may recognize the direction of the user's gaze based on an image identified through the camera 120.

The service module 220 is a module for performing at least one operation according to a received user command. The configuration and operation of the service module 220 may vary according to the function of the robot 100.

Specifically, the service module 220 may control the robot 100 to perform at least one operation based on a user command received from a user set as a subject of interaction during an interaction session.

The interruption determination module 230 is a module for determining whether interruption by another user other than a user set as a subject of interaction occurs during an interaction session.

As described above with an operation of the processor 130, the interruption determination module 230 may determine whether interruption occurs based on a user command of another user received during an interaction session or the location of another user during an interaction session, etc. Detailed examples in this regard will be described below through FIG. 3 to FIG. 6.

Meanwhile, the interruption feedback module 240 is a module for controlling the driver 110 such that the robot 100 performs the aforementioned feedback motion, in case interruption occurs during an interaction session. As an example, the interruption feedback module 240 may control the driver 110 based on motion information stored in advance in the memory of the robot 100.

Hereinafter, detailed examples wherein the robot 100 determines whether interruption occurs will be described through FIG. 3 to FIG. 6.

Figure 3:
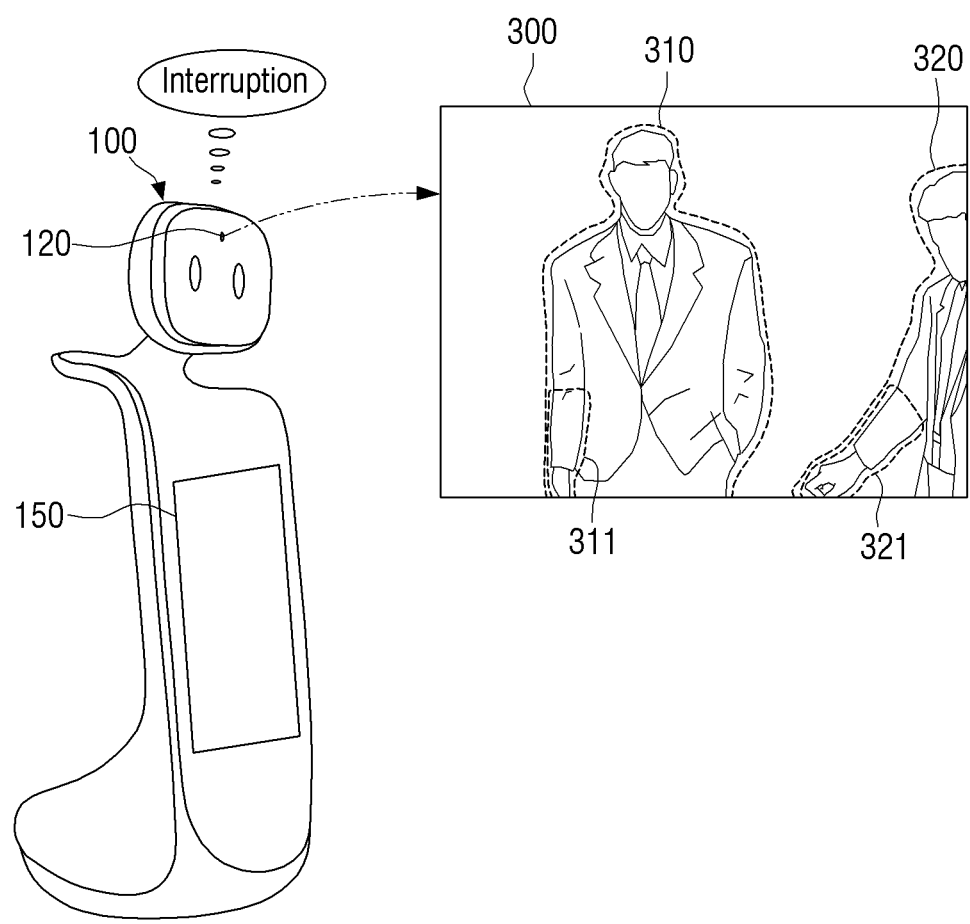
FIG. 3 is a diagram for illustrating an example wherein a robot according to an embodiment determines whether interruption occurs by identifying a subject of a user command based on an image acquired through a camera.

FIG. 3 is a diagram for illustrating an example wherein a robot according to an embodiment determines whether interruption occurs by identifying a subject who input a user command based on an image acquired through a camera.

Referring to FIG. 3, the robot 100 may include a display 150, e.g., a touch screen display implemented to receive input of a touch manipulation, and a camera 120. FIG. 3 assumes a circumstance wherein an interaction session wherein the subject of the interaction is set as a user 310 is proceeding.

Referring to FIG. 3, in case a touch manipulation is input, the processor 130 may determine the subject of the touch manipulation by using an image 300 acquired through the camera 120.

Specifically, the processor 130 may identify each of a user 310 and a user 320 from the image 300, and identify whose touch manipulation the received touch manipulation is between the user 310 and the user 320.

Referring to FIG. 3, the processor 130 may identify that body parts 311, 312 of each of the user 310 and the user 320 become close to the robot 100 (or the display 150 of the robot 100) based on an image acquired through the camera 120.

Specifically, the processor 130 may identify a part 321 that is included in an area constituting the user 320 in the image 300 and is close to the display 150 of the robot 100 based on an RGB image acquired through the camera 120 and depth information for each pixel corresponding to the RGB image. In this case, the processor 130 may identify that a touch manipulation was input from the user 320.

Meanwhile, based on sensing data received through a sensor (a LiDAR sensor, an ultrasonic sensor, etc.), the processor 130 may identify that a body part of the user 310 and/or the user 320 becomes close to the robot 100. According to sensing data, in case it is identified that a body part of the user 320 is close to the display 150 when a touch manipulation is input, the processor 130 may identify that a touch manipulation was input from the user 320.

As described above, if it is identified that an input touch manipulation is a touch manipulation of the user 320 not set as a subject of interaction, the processor 130 may identify that interruption occurred.

Meanwhile, in FIG. 3, only an image 300 acquired from the camera 120 located on the front surface of the robot 100 was illustrated, but other than this, the user 320 can be identified through one or more cameras attached on various side surfaces of the robot 100.

Figure 4A:
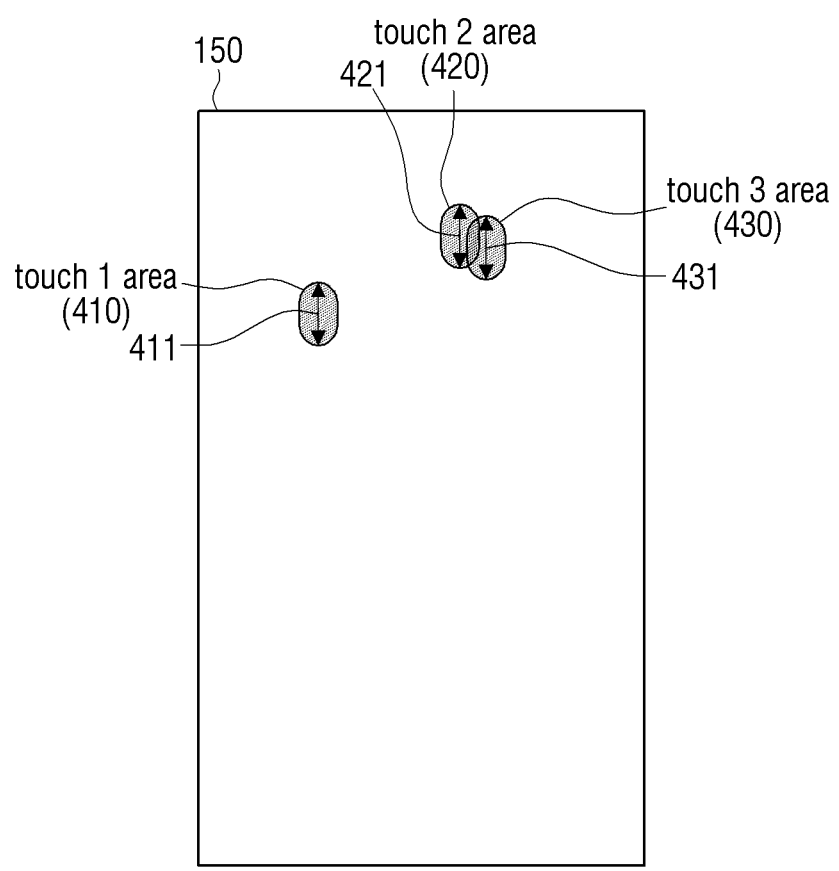
FIG. 4A is a diagram for illustrating an example wherein a robot according to an embodiment determines whether interruption occurs based on the shape of input of a touch manipulation received through a touch screen display.
Figure 4B:
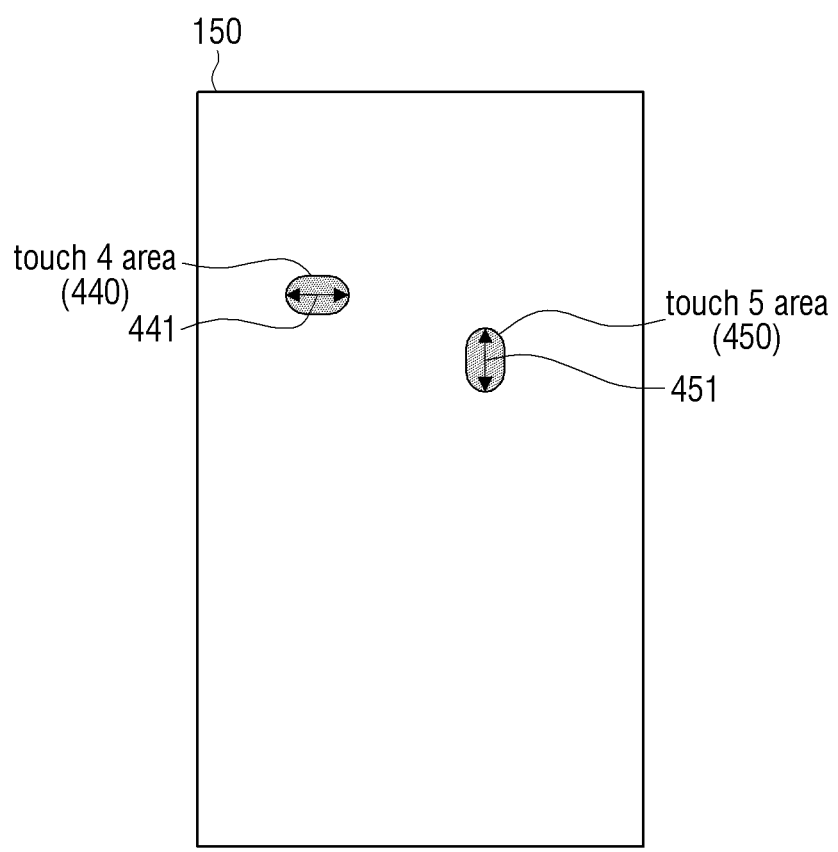
FIG. 4B is a diagram for illustrating an example wherein a robot according to an embodiment determines whether interruption occurs based on the shape of input of a touch manipulation received through a touch screen display.

FIGS. 4A and 4B are diagrams for illustrating an example wherein a robot according to an embodiment determines whether interruption occurs based on the shape of input of a touch manipulation received through a touch screen display. FIG. 4A and FIG. 4B illustrate areas of touches input into the display 150 of the robot 100 in FIG. 3.

Referring to FIG. 4A, in a state wherein a user is set as a subject of interaction, a plurality of touch manipulations (touch 1, 2, 3) may be input into the display 150 from the user.

The plurality of touch manipulations in FIG. 4A may be touch manipulations input in a state wherein it is determined that only a user who is a subject of interaction is close to the robot 100 based on an image acquired through the camera 120.

Here, the processor 130 may identify the major axes 411, 421, 431 of the touch areas 410, 420, 430 of each touch.

Then, the processor 130 may identify the directions (angles) of the major axes 411, 421, 431.

Afterwards, another user who is not a subject of interaction may get close to the robot 100. Here, the processor 130 may determine that another user other than a user who is a subject of interaction is also close to the robot 100, based on an image acquired through the camera 120.

In this case, regarding a touch manipulation that is outside the directions of each of the major axes 411, 421, 431 of a user set as a subject of interaction by greater than or equal to a predetermined angle, the processor 130 may identify that the touch manipulation is a touch manipulation of another user who is not a subject of interaction.

In this regard, FIG. 4B assumes a case wherein it is identified that another user who is not a subject of interaction is also close to the robot 100 in addition to a user who is a subject of interaction, based on an image acquired through the camera 120.

In this case, the processor 130 may identify areas 440, 450 of each of the received touch manipulations (touch 4, 5), and identify the directions (angles) of the major axes 441, 451 of each of the areas 440, 450.

Referring to FIG. 4B, the direction of the major axis 441 of the area 440 of the touch 4 has a big difference of about 90 degrees from the directions of the major axes 411, 421, 431 of the touch areas 410, 420, 430 of a user who is a subject of interaction. Thus, the processor 130 may identify the touch 4 as a touch manipulation of another user who is not a subject of interaction.

As a result, the processor 130 may determine that interruption occurred.

Here, the processor 130 may perform at least one function based on touch manipulations (touch 1, 2, 3, 5) of a user who is a subject of interaction, but may not perform any function based on a touch manipulation of another user (touch 4). That is, a touch manipulation of another user who generated interruption may be blocked.

Figure 5:
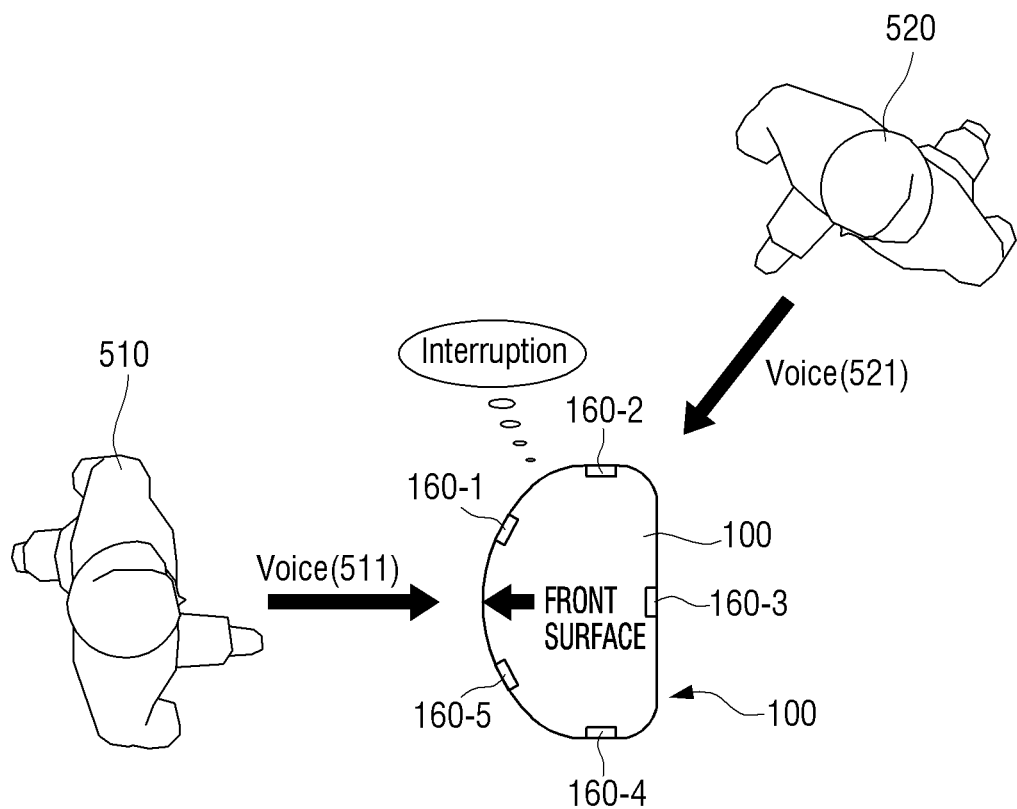
FIG. 5 is a diagram for illustrating an example wherein a robot according to an embodiment determines whether interruption occurs based on a voice received through a plurality of microphones.

FIG. 5 is a diagram for illustrating an example wherein a robot according to an embodiment determines whether interruption occurs based on a voice received through a plurality of microphones.

FIG. 5 illustrates a circumstance wherein the robot 100 and the users 510, 520 are viewed from the above. The robot illustrated in FIG. 5 may be understood as the cross-sectional diagram of the robot 100.

FIG. 5 is based on the premise of a circumstance wherein an interaction session wherein the user 510 is set as a subject of interaction is proceeding. Also, FIG. 5 is based on the premise of a circumstance wherein the processor 130 identified the directions of the users 510, 520 through the camera 120 and/or a sensor (a LiDAR sensor, an ultrasonic sensor, etc.).

Referring to FIG. 5, the robot 100 may include one or more microphones 160, e.g., a plurality of microphones 160-1, 160-2, 160-3, 160-4, and 160-5. Meanwhile, the arrangement state or number of the microphones are not limited to the embodiment in FIG. 5.

Referring to FIG. 5, if a voice 521 is received from the microphones 160-2, 160-3 corresponding to the direction of the user 520 among the plurality of microphones 160-1, 160-2, 160-3, 160-4, and 160-5, the processor 130 may determine that interruption by the user 520 occurred.

Specifically, in case it is identified that there is a voice that is received to be the biggest through the microphones 160-2, 160-3 located in the direction of the user 520 among the plurality of microphones 160-1, 160-2, 160-3, 160-4, and 160-5, the processor 130 may identify that the voice is the voice of the user 520.

Alternatively, in case the voice 521 of the user 520 is received through the microphone 160-2 or the microphone 160-3 simultaneously while the voice 511 of the user 510 is being received through the microphones 160-1, 160-5 toward the user 510 who is a subject of interaction, the processor 130 may identify that the voice of the user 520 other than the user 510 is also being received.

Alternatively, the processor 130 may extract at least one feature information from the voice 511 of the user 510 and generate a model for the voice of the user 510. Afterwards, if a voice 521 having feature information that is not matched with the generated model is received, the processor 130 may identify that a voice of another user who is not the user 510 is being received.

As described above, in case a voice is received from the user 520 who is not a subject of interaction, the processor 130 may determine that interruption by the user 520 occurred.

Here, the processor 130 may perform at least one function based on the voice 511 of the user 510 who is a subject of interaction, but may not perform any function based on the voice 521 of the user 520. That is, a voice input of the user 520 who generated interruption may be blocked.

Figure 6:
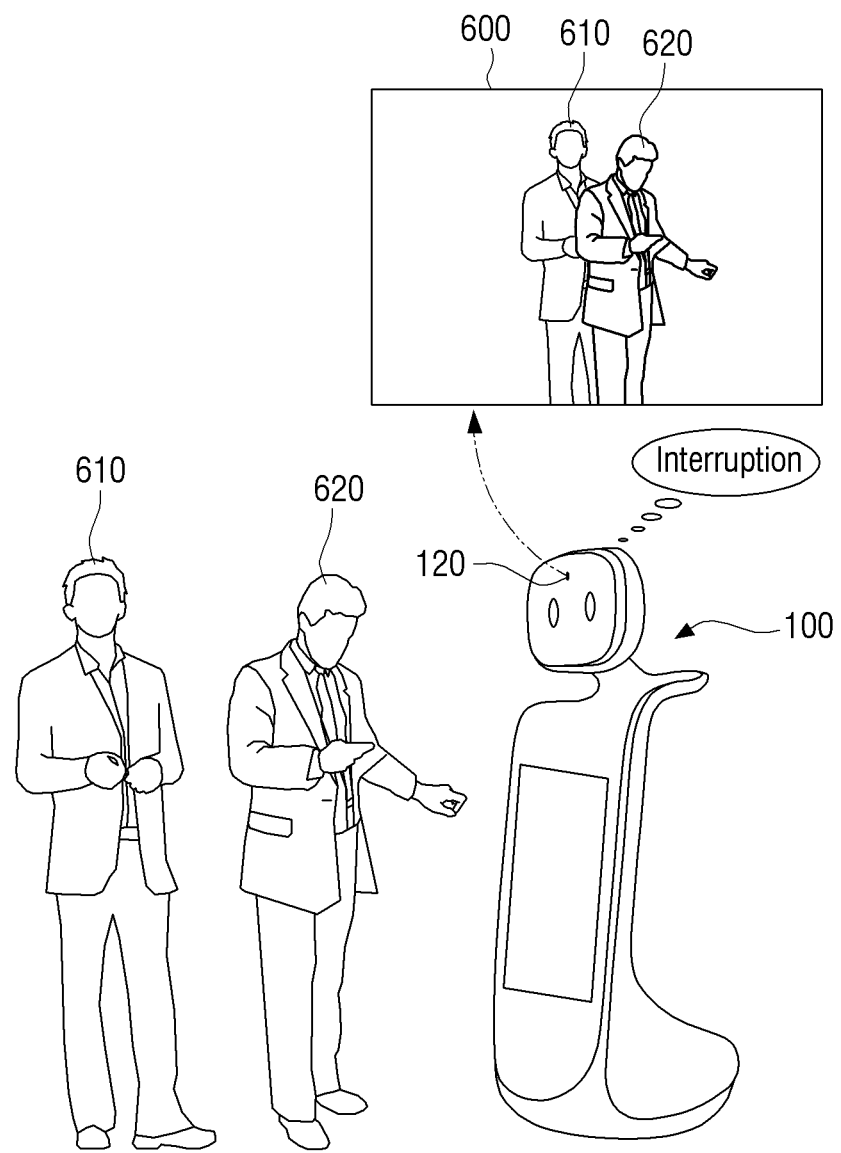
FIG. 6 is a diagram for illustrating an example wherein a robot according to an embodiment determines whether interruption occurs by determining a location of a user who is not a subject of interaction based on an image acquired through a camera.

FIG. 6 is a diagram for illustrating an example wherein a robot according to an embodiment determines whether interruption occurs by determining a location of a user who is not a subject of interaction based on an image acquired through a camera.

FIG. 6 assumes a circumstance wherein an interaction session wherein a subject of interaction is set as the user 610 is proceeding.

Referring to FIG. 6, the processor 130 may identify that the user 620 who is not a subject of interaction is located between the robot 100 and the user 610, based on the image 600 acquired through the camera 120. In this case, the processor 130 may determine that interruption by the user 620 occurred.

Meanwhile, in case the robot 100 is implemented to perform at least one function based on a user motion recognized based on the camera 120 or a motion sensor, the processor 130 may perform at least one function corresponding to the motion of the user 610 who is a subject of interaction, but may not perform any function in response to the motion of the user 620 who is not a subject of interaction.

Meanwhile, the embodiments of FIGS. 3, 4A, 4B, 5, and 6 may be implemented independently from one another, but whether interruption occurs may be determined as a result of two or more embodiments among them being performed together.

Figure 7A:
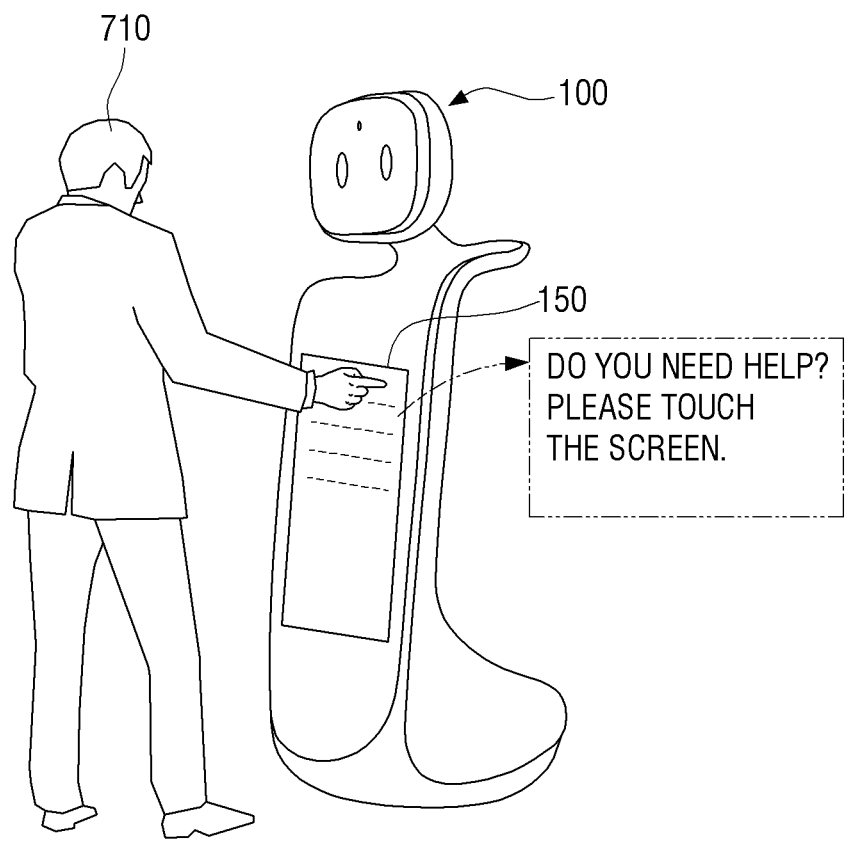
FIG. 7A is a diagram for illustrating a specific example wherein a robot according to an embodiment operates according to a user's circumstance and whether interruption occurs after starting an interaction session.
Figure 7B:
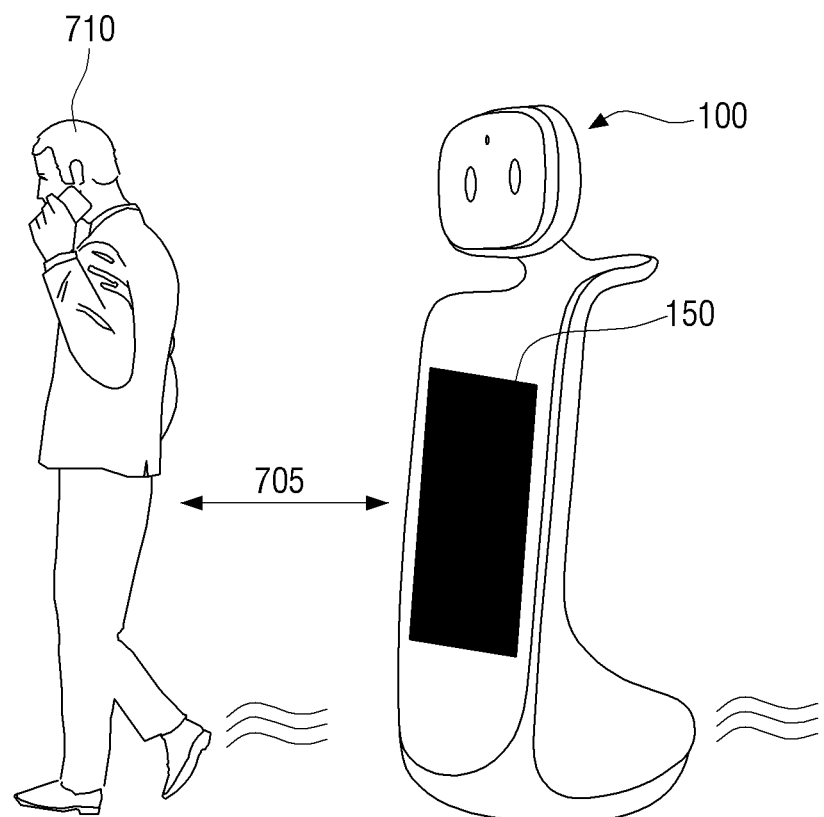
FIG. 7B is a diagram for illustrating a specific example wherein a robot according to an embodiment operates according to a user's circumstance and whether interruption occurs after starting an interaction session.
Figure 7C:
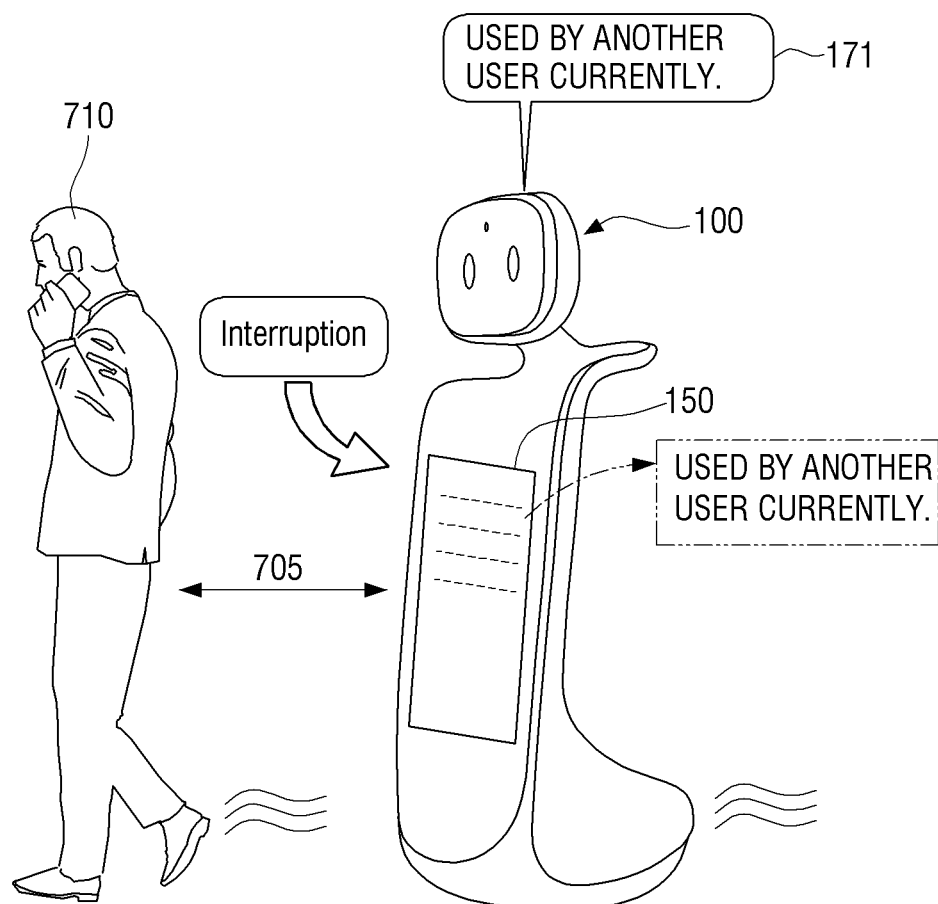
FIG. 7C is a diagram for illustrating a specific example wherein a robot according to an embodiment operates according to a user's circumstance and whether interruption occurs after starting an interaction session.

FIG. 7A to FIG. 7C are diagrams for illustrating a specific example wherein a robot according to an embodiment operates according to a user's circumstance and whether interruption occurs after starting an interaction session.

Referring to FIG. 7A, if a user command is received from the user 710, the processor 130 may set the user 710 as a subject of interaction. In the case of FIG. 7A, a user command is a touch manipulation, but other than this, a voice or a motion, etc. are possible.

Also, unlike FIG. 7A, regardless of whether a user command was received from the user 710, if only the user 710 is identified in an image acquired through the camera 120, the user 710 may be immediately set as a subject of interaction.

During an interaction session wherein the user 710 is set as a subject of interaction, the processor 130 may display a user interface corresponding to a user command received from the user 710 on the screen of the display 150 or acoustically provide it (ex; using the speaker).

Meanwhile, as in FIG. 7B, a case wherein the user 710 who is a subject of interaction looks away briefly or performs another personal business during an interaction session may occur.

In this regard, during an interaction session, the robot 100 may identify in real time the time that a state wherein a user command is not received is maintained and/or the time that a state wherein the direction of a user's gaze is not toward the robot 100 is maintained, etc.

As a specific example for identifying the direction of gaze, the processor 130 may recognize the head of a user by using an image acquired through the camera 120 (ex. an RGB image). Then, the processor 130 may identify points related to the directions of the face such as the eyes, the nose, the ears, the chin, etc. in the head. Then, the processor 130 may recognize the direction of a user's gaze based on the directional relation among the identified points. Here, the processor 130 may use a separate artificial intelligence model trained to detect the direction of gaze from a facial image.

Referring to FIG. 7B, during a predetermined first time, in case a user command is not received from the user 710, or the user 710 is not toward the robot 100, the processor 130 may inactivate the screen of the display 150.

In case a user interface is unnecessarily displayed in a circumstance wherein the user 710 does not look at the robot 100, there is a problem that information regarding an instruction or personal matters of the user 710 may be unintentionally revealed to another user. Accordingly, the processor 130 may inactivate the screen in case the user 710 is not toward the robot 100, and thereby prevent unnecessary revealing of personal information.

Here, the processor 130 may control the driver 110 such that the robot 100 is located within a predetermined distance 705 from the user 710. As a result, even if the user 710 performs another job briefly, it may be expressed clearly to the user 710 and other users that interaction with the user 710 is still proceeding.

In a state wherein the screen of the display 150 is inactivated, in case interruption occurs by another user who is not the user 710 who is a subject of interaction, the processor 130 may not only control the driver 110 to perform a feedback motion, but also display a screen indicating that an interaction session is proceeding on the display 150.

In this regard, FIG. 7C assumes a circumstance wherein interruption occurred by another user in the state as in FIG. 7B.

Referring to FIG. 7C, if interruption occurs, the processor 130 may control the driver 110 such that the robot 100 continuously maintains the distance with the user 710 (within 705), and perform a feedback motion. In addition, the processor 130 may control the display 150 to display a user interface wherein a guide that 'the robot is currently being used by another user' is written. Also, the processor 130 may control the speaker of the robot 100 to output a voice 171 that 'the robot is currently being used by another user.'

Meanwhile, during a predetermined second time longer than the aforementioned predetermined first time, in case a user command is not received from the user 710 who is a subject of interaction or the user 710 is not toward the robot 100, the processor 130 may end the interaction session with the user 710.

In this case, the processor 130 may set another user identified in an image acquired through the camera 120 as a subject of interaction and start a new interaction session. Specifically, if a user command is received from an identified user, the processor 130 may set the user as a subject of new interaction.

Figure 8:
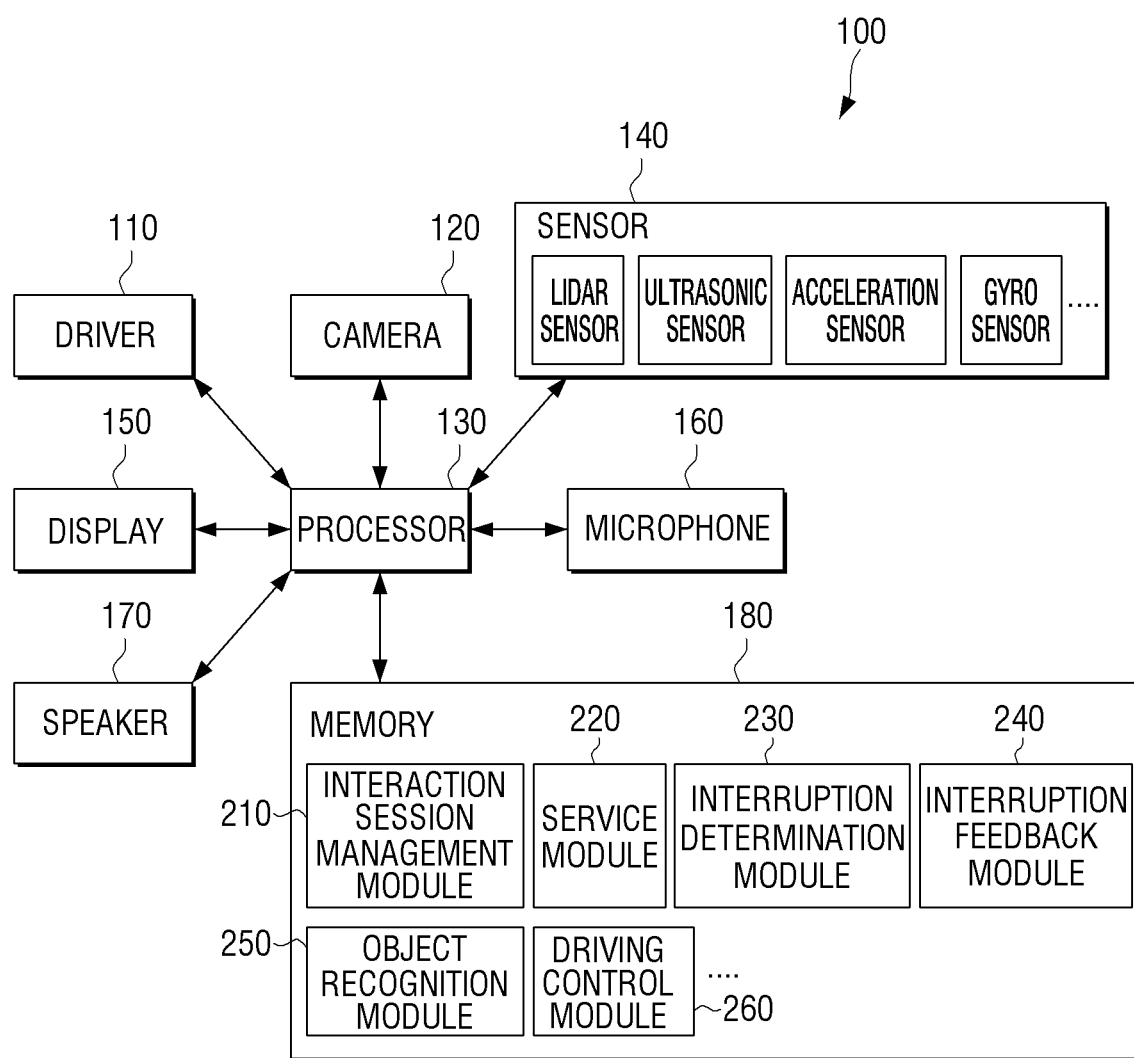
FIG. 8 is a block diagram for illustrating a detailed configuration of a robot according to an embodiment.

FIG. 8 is a block diagram for illustrating a detailed configuration of a robot according to an embodiment.

Referring to FIG. 8, the robot 100 may further include a sensor 140, a display 150, a microphone 160, a speaker 170, a memory 180, etc. other than the driver 110, the camera 120, and the processor 130.

The sensor 140 is a component for acquiring various information regarding the surroundings of the robot 100. The sensor 140 may include a LiDAR sensor, an ultrasonic sensor, an acceleration sensor, a gyro sensor, etc., and other than them, various sensors may be provided in the robot 100.

As an example, the processor 130 may detect the existence of a user existing in an adjacent location based on sensing data received through a LiDAR sensor or an ultrasonic sensor, and identify the user from an image photographed through the camera 120 in the direction of the detected user.

Here, the processor 130 may track the user based on feature information of an image including the user's face. Specifically, the processor 130 may extract feature information of an image including the user's face, and then compare at least one area within an image consecutively acquired later with the feature information and thereby consecutively track the location and direction of the user. Feature information may be defined according to output of at least one artificial intelligence model trained to extract feature information from an image or map feature information with another image for face recognition.

The display 150 is a component for visually outputting various contents or a user interface. The display 150 may be implemented as a form of a touch screen display for receiving a user command in the form of a touch.

In the robot 100, one or more displays 150 may be provided. As an example, in case the robot consists of a body provided with a moving means such as a wheel and a head attached on the body, displays may be provided respectively on the front surface of the head and the front surface of the body, but the disclosure is not limited thereto.

The microphone 160 is a component for receiving input of an audio signal from the outside. The robot 100 may include one or more microphones.

The robot 100 may perform at least one operation based on a user voice received through the microphone 160. Specifically, the processor 130 may convert a user voice into a text by using an acoustic model and a language model, etc., and then identify a user command corresponding to the user voice based on the converted text. Then, the processor 130 may operate based on the identified user command.

The speaker 170 is a component for outputting an audio signal. The processor 130 may control the speaker 170 to output various information or a user interface in the form of a voice.

The memory 180 is a component for storing an operating system (OS) for controlling the overall operations of the components of the robot 100 and at least one instruction or data related to the components of the robot 100.

The processor 130 may perform operations according to the aforementioned various embodiments by executing at least one instruction stored in the memory 180.

The memory 180 may include a non-volatile memory such as a ROM, a flash memory, etc., and include a volatile memory consisting of a DRAM, etc. Also, the memory 180 may include a hard disc, a solid state drive (SSD), etc.

Referring to FIG. 8, the memory 180 may further include an object recognition module 250, a driving control module 260, etc. other than the interaction session management module 210, the service module 220, the interruption determination module 230, and the interruption feedback module 240 described above.

The object recognition module 250 is a component for identifying at least one object (ex. a user/a person) from an image acquired through the camera 120. The object recognition module 250 may use an artificial intelligence model trained to identify objects.

The driving control module 260 is a component for controlling the motion of the robot 100 through the driver 110. The driving control module 260 may control the driver 110 such that a motion included in a service provided to a user who is a subject of interaction or the aforementioned feedback motion is performed by the robot 100.

Hereinafter, an operating method of a robot according to an embodiment will be described through FIG. 9 to FIG. 10.

Figure 9:
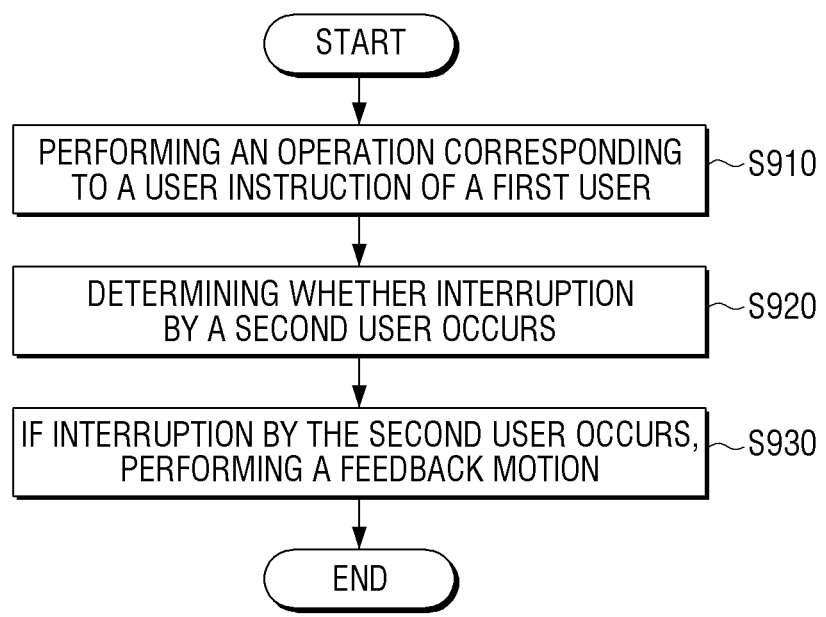
FIG. 9 is a block diagram for illustrating an operating method of a robot according to an embodiment.

FIG. 9 is a block diagram for illustrating an operating method of a robot according to an embodiment.

Referring to FIG. 9, in the method according to an embodiment, an operation corresponding to a user command received from a first user may be performed during an interaction session wherein the first user is set as a subject of interaction at operation S910. Here, the first user may be identified from an image acquired through the camera.

During an interaction session with the first user, in the method according to an embodiment, it may be determined whether interruption by a second user identified in an image acquired through the camera occurs at operation S920.

As an example, in case a user command is received from the second user identified in an image acquired through the camera, it may be determined that interruption by the second user occurred.

As an example, in case the robot includes a plurality of microphones, the direction of the second user may be determined based on an image acquired through the camera, and if a user voice is received from the microphone corresponding to the direction of the second user among the plurality of microphones, it may be determined that interruption by the second user occurred.

As an example, in case the robot includes a touch screen display, if it is determined that a touch manipulation input into the touch screen display is a touch manipulation by the second user based on an image acquired through the camera, it may be determined that interruption by the second user occurred.

As an example, if it is determined that the second user is located between the robot and the first user based on an image acquired through the camera, it may be determined that interruption by the second user occurred.

Further, if it is determined that interruption by the second user occurred, in the method according to an embodiment, a feedback motion for the interruption may be performed at operation S930.

Specifically, a feedback motion wherein the front surface of the robot is toward the first user and is against the second user may be performed.

In case a touch screen display that is arranged on the front surface of the robot and is for receiving input of a touch manipulation corresponding to a user command is provided on the robot, a feedback motion wherein the robot moves to a location wherein the front surface of the robot is toward the first user and the side surface or the rear surface of the robot is toward the second user may be performed.

Figure 10:
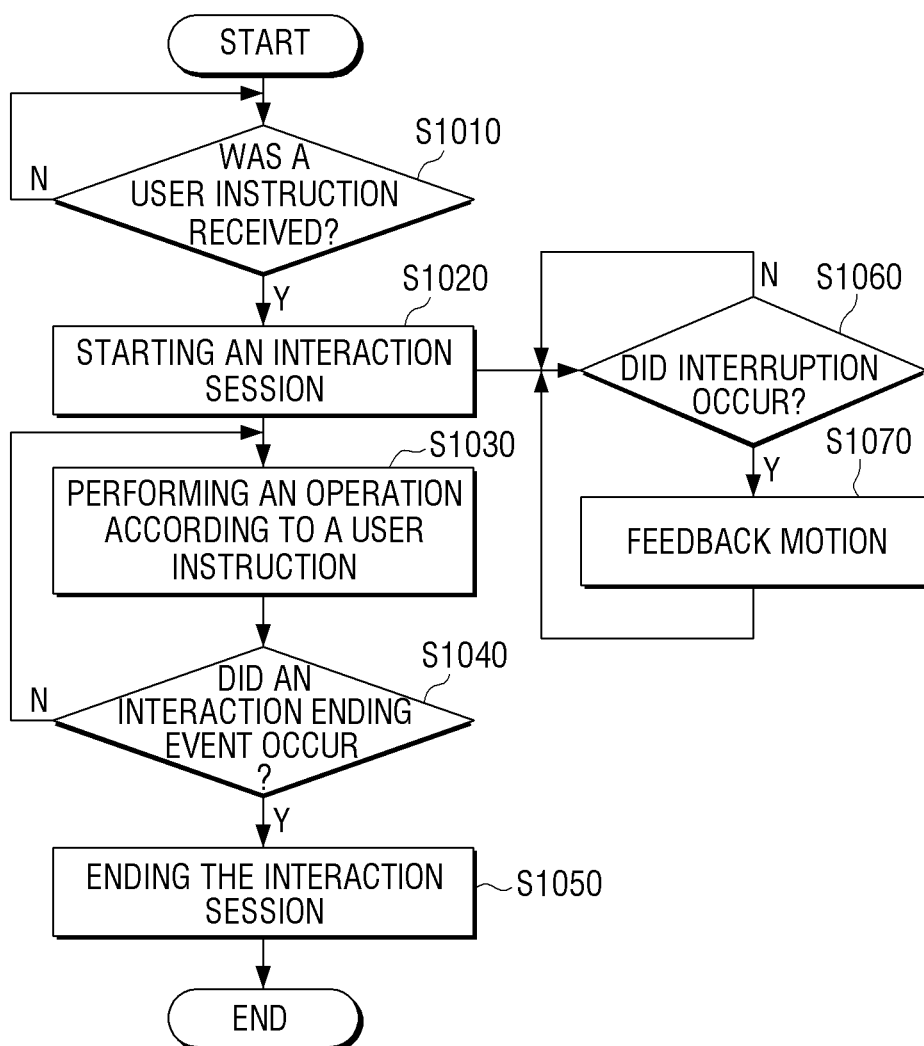
FIG. 10 is an algorithm for illustrating an example wherein a robot according to an embodiment performs a feedback motion for interruption during an interaction session.

FIG. 10 is an algorithm for illustrating an example wherein a robot according to an embodiment performs a feedback motion for interruption during an interaction session.

Referring to FIG. 10, in case a user command is received from a user identified through a camera and/or a sensor at operation S1010—Y, the user may be set as a subject of interaction and an interaction session with the user may start at operation S1020.

During an interaction session, an operation may be performed according to a user command received from the user at operation S1030. As a specific example, a user interface corresponding to a user command received from the user may be displayed on the screen of the touch screen display.

While the interaction session is maintained, it may be determined whether interruption by another user who is not a subject of interaction occurred at operation S1060. In case interruption occurred at operation S1060—Y, a feedback motion for refusing or disregarding the interruption may be performed at operation S1070.

Meanwhile, during a predetermined first time, in case a user command is not received from a user who is a subject of interaction or the user is not toward the robot, the screen of the touch screen display may be inactivated. Here, in case it is determined that interruption by another user who is not a subject of interaction occurred, a screen notifying that an interaction session is proceeding may be displayed on the touch screen display.

In case an interaction ending event occurs at operation S1040, the interaction session may end at operation S1050. An interaction ending event may include a case wherein an operation corresponding to a user command ended, a case wherein a user command is not received for more than a specific time period, a case wherein the direction of a user's gaze is not toward the robot for more than a specific time period, etc.

For example, during a predetermined second time longer than the aforementioned predetermined first time, in case a user command is not received from a user who is a subject of interaction or the user is not toward the robot, an interaction session may end.

After an interaction session ends, in the operating method according to an embodiment, if a user command is received from a new user identified in an image acquired through the camera, the new user may be set as a subject of interaction and a new interaction session may start.

The operating method described above through FIG. 9 to FIG. 10 may be implemented through the robot 100 illustrated and described through FIG. 2 and FIG. 8.

Meanwhile, at least a part of the operating method described above through FIG. 9 to FIG. 10 may be performed through an external apparatus (ex. a server apparatus, a terminal apparatus, etc.) that can communicate with the robot 100.

A robot according to an embodiment prevents interruption by another user in case an interaction session with a specific user is proceeding, and as a result of this, there is an effect that a service that is correct to the last can be provided to the original user who was being provided with the service through the interaction session.

Also, a robot according to an embodiment has an effect that, in case a user command, etc. are received from a user who is not a subject of interaction while an interaction session is proceeding, it is possible to make the user recognize that an interaction session with another user is already proceeding through a feedback motion and/or various outputs.

Meanwhile, the aforementioned various embodiments may be implemented in a recording medium that can be read by a computer or an apparatus similar to a computer, by using software, hardware, or a combination thereof.

According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions.

In some cases, the embodiments described in this specification may be implemented as the processor 130 itself. Meanwhile, according to implementation by software, the embodiments such as procedures and functions described in this specification may be implemented as separate software modules. Each of the aforementioned software modules may perform one or more functions and operations described in this specification.

Meanwhile, computer instructions for performing processing operations at the robot 100 according to the aforementioned various embodiments of the disclosure may be stored in a non-transitory computer-readable medium. Computer instructions stored in such a non-transitory computer-readable medium make the processing operations at the robot 100 according to the aforementioned various embodiments performed by the aforementioned specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer-readable medium such as a CD, a DVD, a hard disc, a blue-ray disc, a USB, a memory card, a ROM and the like.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A robot comprising:
a driver;
a camera; and
a processor configured to:
during an interaction session in which a first user is identified, identify whether interruption by a second user occurs during the interaction session with the first user,
based on identifying that the interruption by the second user occurred during the interaction session with the first user, control the driver such that the robot performs a feedback motion directed to the second user such that the robot is not facing the second user.

2. The robot of claim 1, wherein the processor is further configured to:
control the driver to such that side surface or rear surface of the robot is toward the second user.

3. The robot of claim 1, further comprising:
display,
wherein the processor is further configured to:
control the display to display information indicating that the robot is in interaction with the first user.

4. The robot of claim 1, wherein the processor is further configured to:
based on a user command not being received from the first user for predetermined time, control the driver such that front side of the robot is toward the second user.

5. The robot of claim 1, further comprising:
a touch screen display,
wherein the processor is further configured to:
during the interaction session, based on identifying that a touch manipulation input into the touch screen display is a touch manipulation by the second user, identify that the interruption by the second user occurred.

6. The robot of claim 1, wherein the processor is further configured to:
while the robot performing the feedback motion, control the driver such that a distance between the robot and the first user is maintained.

7. The robot of claim 1, wherein the processor is further configured to:
control the driver such that the robot is driven to avoid the second user.

8. An operating method of a robot, the operating method comprising:
during an interaction session in which a first user identified, identifying whether interruption by a second user occurs during the interaction session with the first user;
based on identifying that the interruption by the second user occurred during the interaction session with the first user, performing a feedback motion directed to the second user,
wherein the performing the feedback motion comprises:
performing the feedback motion in which the robot is not facing the second user.

9. The operating method of claim 8, wherein the performing the feedback motion comprises:
performing the feedback motion in which side surface or rear surface of the robot is toward the second user.

10. The operating method of claim 8, wherein the performing the feedback motion comprises:
displaying information indicating that the robot is in interaction with the first user.

11. The operating method of claim 8, wherein the method further comprising:
based on a user command not being received from the first user for predetermined time, performing operation in which front side of the robot is toward the second user.

12. The operating method of claim 8, identifying whether interruption by the second user occurs further comprising:
during the interaction session, based on identifying that a touch manipulation input into the touch screen display is a touch manipulation by the second user, identifying that the interruption by the second user occurred.

13. The operating method of claim 8, wherein the method further comprising:
    while the robot performing the feedback motion, performing operation in which a distance between the robot and the first user is maintained.

14. The operating method of claim 8, wherein the performing the feedback motion comprises:
    performing the feedback motion in which the robot is driven to avoid the second user.

15. A computer program product comprising a non-transitory computer-readable storage medium comprising a program executing a method of controlling a robot, wherein the method comprising:
    during an interaction session in which a first user identified, identifying whether interruption by a second user occurs during the interaction session with the first user;
    based on identifying that the interruption by the second user occurred during the interaction session with the first user, performing a feedback motion directed to the second user,
    wherein the performing the feedback motion comprises:
    performing the feedback motion in which the robot is not facing the second user.

16. The computer program product of claim 15, wherein the performing the feedback motion comprises:
    performing the feedback motion in which side surface or rear surface of the robot is toward the second user.

17. The computer program product of claim 15, wherein the performing the feedback motion comprises:
    displaying information indicating that the robot is in interaction with the first user.

\* \* \* \* \*